United States Patent

Kongsgaard

[11] Patent Number: 6,095,235
[45] Date of Patent: Aug. 1, 2000

[54] HEATING ELEMENT FOR A FLOOR

[76] Inventor: Bjarne Kongsgaard, Aegirsvej 28, Silkeborg, Denmark, DK-8600

[21] Appl. No.: 09/297,139

[22] PCT Filed: Oct. 24, 1997

[86] PCT No.: PCT/DK97/00469

§ 371 Date: Jun. 4, 1999

§ 102(e) Date: Jun. 4, 1999

[87] PCT Pub. No.: WO98/17953

PCT Pub. Date: Apr. 30, 1998

[30] Foreign Application Priority Data

Oct. 24, 1996 [DK] Denmark ................... 1179/96

[51] Int. Cl.[7] ............................................ F24D 3/14
[52] U.S. Cl. ..................... 165/56; 165/49; 165/54; 165/10; 237/69; 119/525; 119/527; 119/528; 119/529; 119/530; 119/508
[58] Field of Search ..................... 165/56, 49, 54, 165/10; 237/69; 119/525, 527, 528, 529, 530, 508

[56] References Cited

U.S. PATENT DOCUMENTS

| 1,625,987 | 4/1927 | Crittall et al. | 165/56 |
| 3,795,272 | 3/1974 | Kahn et al. | 165/54 |
| 3,815,550 | 6/1974 | Becker | 119/28 |
| 4,217,859 | 8/1980 | Herring | 119/508 |
| 4,348,986 | 9/1982 | Marrs | 119/508 |
| 4,591,694 | 5/1986 | Phillips | 219/217 |

FOREIGN PATENT DOCUMENTS

| 40 05 915 | 8/1991 | Germany. | |
| 0023697 | 3/1981 | Japan | 165/56 |
| 0071793 | 6/1981 | Japan | 165/56 |
| 0138690 | 10/1981 | Japan | 165/56 |
| 0006327 | 1/1988 | Japan | 237/69 |
| WO 93/22905 | 11/1993 | WIPO. | |

*Primary Examiner*—John K. Ford
*Attorney, Agent, or Firm*—James Creighton Wray; Meera P. Narasimhan

[57] ABSTRACT

A heating element (12) is described for use in flooring, preferably for pigstys (3). The heating elements consist of a liquid filled chamber (16). The liquid in the chamber is brought into heat transmitting connection with a conduit (24) connected with a heat source. The connection between the conduit (24) and the chamber (16) do not have to be pressure tight, as no pressure occurs in the chamber (16). Therefore, a relatively simple connection may be established and there will only be a small risk of leakage.

13 Claims, 3 Drawing Sheets

HEATING ELEMENT FOR A FLOOR

BACKGROUND OF THE INVENTION

The present invention relates to a heating element for use in a building and of the kind that is built up from modular elements having engagement means for interacting with corresponding engagement means on other modular elements, which heating element comprises a chamber containing a heating liquid and which chamber constitutes one side of a heat exchanger, the other side of which heat exchanger is constituted by a conduit extending through the chamber and connecting a number of heating elements, which conduit is a liquid or steam conveying conduit that is fastened in liquid tight connection with passageways in two mutually facing walls in the chamber.

Floors in livestock stables which are constituted by grid elements are known, e.g. from DE-A-4006915. However, this publication does not give any solution to the support of the elements and to the specific inter-connection of the chambers. The grid elements are shaped with means for coupling with corresponding grid elements, so that a continuous floor or a continuous floor surface is formed. The grid elements are placed on supporting means in the form of a row of parallel ribs extending crosswise in a stable. Grooves provided at the underside of the grid elements are placed over these ribs. The grooves are preferably formed in tooth-shaped projections that go in between corresponding tooth-shaped projections on an adjacent grid element. In such floors the grid elements will preferably be made from plastic. Alternatively, they may also be made from cast iron, steel, or concrete.

In certain parts of the floor surface of the stable floor, it is desired to make use of plate elements which may be heated. These plate elements may be made as a modular element or as an insertable element that may be placed in a frame element interacting with the other grid elements. The heating plates may be electric heating plates or plates that may be heated by means of hot water passing through a chamber. Such a chamber is connected with other heating elements and with a hot water source by means of conduits connecting each of the chambers and which extend underneath the floor construction.

The heating of a floor construction is wished for example in piggeries of considerations to the piglets. In this way modular elements for a floor construction containing heating elements will be placed in the sections of the stable or the pigsty where piglets are found.

Even though a heating element according to the present invention is developed primarily with the purpose of use in livestock stables, then it will also be possible to use the heating element in a floor heating system in other kinds of floors that livestock floors. The heating element may thus be used for heating floors where the other modular elements do not necessarily have to be grid elements. Examples of these may be floors in factories, offices, public buildings, and houses for living.

In the known floor constructions inaccuracies and apparent tolerances occur in the manufacture of steel, concrete, and plastic elements that may form a part of the floor construction. Also, the different elements will be able to make a mutual movement because of the loads occurring when the floor is in use. Furthermore, lesser dislocations, because of thermic action on the single elements in the floor construction, occur. On this background, a risk of leakages occur where the water chambers are connected with the pressurised conduits for the hot water supply. Such a leakage may be very difficult to discover, because it is found at the underside of the floor construction. In stables, leaking of water will be very difficult to discover since animal droppings and urine pass through the grid elements of the floor construction.

The known heating plates may be difficult to mount, since they require adaptation from the underside of the floor construction after they have been placed on the supporting ribs. In many livestock stables there will be limited space under the grid elements and the floor situated beneath in the stable. This may make mounting, coupling together, screwing fast, etc., difficult. It is desirable to be able to mount heating elements with almost the same easiness as the remaining grid elements in the floor construction.

From DE-A1-40 05 915 heating elements of the kind mentioned in the introduction are known. These elements are intended for use in the ceiling of the building. The form of the known elements therefore do not take any consideration to the peculiar mounting and strength conditions which are found in a floor construction where the heating elements at the same time provide a floor surface for, for example, animals.

SUMMARY OF THE INVENTION

It is the object of the present invention to provide a heating element of the kind mentioned in the introduction and which is suitable for use in a floor and especially is used in a stable floor and where the above-mentioned drawbacks are avoided, said heating element also being easy to assemble with the rest of the construction.

This object is achieved, according to the present invention, with a heating element being distinctive in that the heating element is for use in a floor, especially for stables for livestock, that parallel grooves are arranged at the underside of the modular elements in a location corresponding to underlying supporting rails and which function is to engage the rails, that the chamber is provided immediately under a floor surface of the element, and that at least a part of the chamber has such a depth under the floor surface that the passageways are in a level under the support rails.

With this construction it may be said that the heating element comprises a heat exchanger. The chamber in the heating element filled with liquid is in heat exchanging connection with the conduit passing through the chamber. Hereby, considerably lesser demands are made on the connections established between the liquid chamber of the heating element and the conduit, as the ceiling do not have to resist water or steam pressure.

In connection with heating elements of plastic it is an appreciable advantage to use a heat exchanger. Polypropylene is usually used for heating elements of plastic. It is recommended to have as low a temperature as possible in order to avoid damaging actions on the plastic. It is decisive that there is a temperature of about 37° C. at the surface of the heating element if the heating element is to be used for pigs. By using a construction according to the invention it will be possible to use a traditional conducting temperature for hot water of about 72° C. By suitable dimensioning this permits a temperature in the liquid in the chamber of about 42° C. This will result in a surface temperature on the heating element of about 37°C.

In known constructions with water flow through the chamber it appears that a very inferior circulation is achieved, resulting in large temperature gradients over the heating element. Experiments have been made to solve this by making the chamber with channel forming elements.

However, this results in a complicated and costly construction and also a construction in which deposits can occur in the formed channels. With the present invention it has appeared that a very uniform and even temperature over the whole heating element is achieved. It is assumed that it is the natural flow occurring in the water, because of the warming up of the water found in immediate presence of the conduit that gives rise to flows in the chamber. In order to achieve the best flow possible, it is an advantage that the conduit is found at a certain distance under the floor surface, as a number of rising flows are created hereby and thereby more flows and turbulences in the chamber. This contributes to a uniform temperature all over the surface of the heating element.

Usually the conduit will be a liquid or a steam conducting conduit. However, it will also be possible to use an electric wire which powers a heating element in the liquid chamber. In both cases it will not be necessary to have a water pressure in the chamber, and there will therefore be less risk that a leakage occurs at the connection between the liquid chamber and the wire.

The chamber can be used as a small heat reservoir. In case of temporary disruptions in the hot water supply, the liquid content of the chamber will act as a buffer. The heating element will therefore maintain its heat in short periods of time. This may be of substantial significance for piglets or other young ones of animals in a livestock stable.

As relatively simple connection means between the conduit and the chamber may be used it will be simple and quick to make a mutual fastening after the frame element has been placed in the floor construction.

According to a preferred embodiment the passageways of the chamber are constituted by threaded pipe stubs made integrally with the side walls. These stubs interact with a packing and a union that may be screwed into the stub. Thus, it will be possible to place packings and union in the stub before mounting the conduit. After mounting the conduit, it will thus be sufficient to screw the union fast in order to achieve a radial expansion of the packing for establishing a tightening engagement about the conduit.

The heating element will preferably be made for receiving a liquid or steam conveying conduit which is straight, Thus, the chamber has passageways in mutually facing walls. This makes the mounting particularly easy since a straight pipe is just slided through a number of lined up heating elements after they have been placed in a floor construction. Such a mounting will be particularly easy when at least a part of the chamber has a depth so that the passageways are in a level under the supporting ribs. Hereby a straight conduit may be slided through the passageways irrespectively of the orientation of the passageways in relation to the orientation of the modular elements in the floor construction.

If the chamber has a T-shaped cross section, the conduit may pass through the chamber in a position at the bottom of the stem of the T. Hereby, the amount of liquid to be used in the chamber is reduced and it becomes possible to achieve a faster heat transmission from the conduit to the face of the floor. The stem of the T will usually be placed symmetrically in relation to the heating element. However, it will also be possible to place the stem of the T asymmetrically in relation to the heating surface in order to achieve special building-in conditions where it may be easier to place a piping arrangement near the edge of a heating element.

Due to considerations of stability against twisting in such a T-shaped heating element, a number of connection points are formed in the part of the chamber that is constituted by the crossing branch of the T. i.e. the part of the chamber that is found immediately under the floor surface of the heating element.

The chamber may be filled with liquid after the conduit has been mounted. This takes place very easily if the chamber is provided with a filling aperture which is in the floor surface of the element.

The conduit used for liquid or steam transport may be a metal pipe. Alternatively, it will also be possible to use conduits made from a metallised plastic material. In a practical embodiment a conduit of so-called ALUPEX has shown to be usable. These conduits may be provided from Nordisk Wavin. By mounting a pipe that stretches continuously through a number of chambers placed side by side it will only be necessary to connect the ends of the conduits with the source of heat supply by means of pressure tight connections. Such connections may be placed in special service channels outside the part of the floor making up the floor surface for the animals. Here the work may be done in a more simple way, and furthermore it will be possible with a surveillance for localising a possible leakage.

The heating element may be manufactured with integral engagement means and supporting grooves so that it by itself constitutes a modular element. A particularly simple heating element is achieved hereby which may be mounted quickly.

If the heating element is made as an insertable element it may be used in floor constructions made up of different modular elements. Such an insertable element is adapted for placing in a frame element which by itself constitutes a modular element, and which may be built together with the other modular elements in the floor construction.

According to a special embodiment the heating element is connected with at least upwardly directed chamber sections forming the walls and possible ceiling for a heating box that is placed on the formed floor.

In a further development thereof the upwardly directed chamber sections are connected with the chamber under the floor surface by means of quick-acting couplings.

According to a further embodiment the further chamber sections are provided with a conduit extending through the further chamber sections, and which is connected directly with the conduit placed under the formed floor.

The heating box which is placed on the formed floor may be provided with a lid. The lid may be opening either by being hinged to the vertical parts of the chamber or by being placed slidably in relation to these to give access to the chamber. The opening may furthermore be used as a temperature regulation by opening the lid more or less.

BRIEF DESCRIPTION OF THE DRAWINGS

The invention will now be explained in detail with reference to the accompanying schematic drawing, in which.

DETAILED DESCRIPTION

Figure 1:
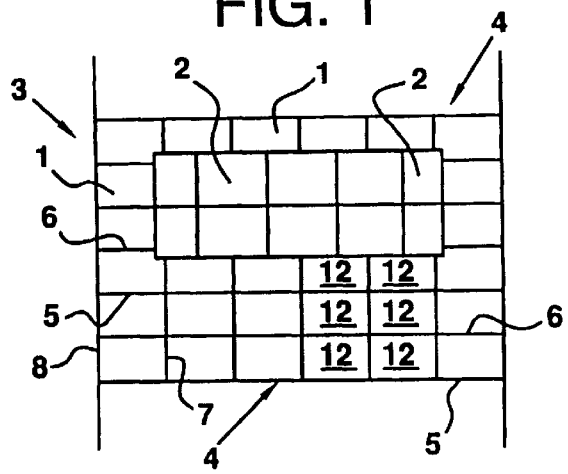
FIG. 1 shows a two-dimensional view illustrating a flooring in a pigsty.

FIG. 1 illustrates a floor in a pigsty, especially a farrowing pen. In the pigsty two different types of grids 1,2 are used. The first-mentioned grids 1 form a first level in the farrowing pen, and the other grids 2 form another level in the farrowing pen. The other grids are intended as a stand for a sow.

Figure 2:
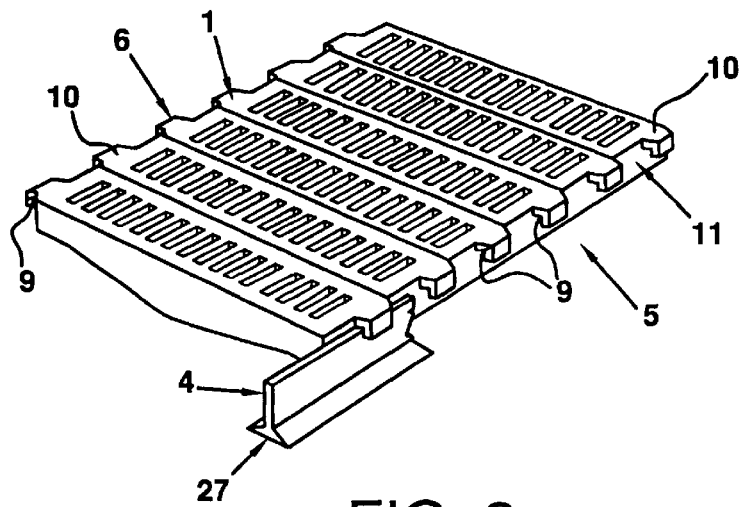
FIG. 2 shows a perspective view illustrating a modular element for manufacturing the flooring.

In FIG. 2 an example is shown of a first grid. The first grids 1 in the pigsty 3 are supported on supporting ribs 4 shown partially on FIG. 2. The supporting ribs 4 rest on elevated spots or directly on a stable floor. The supporting ribs 4 extend crosswise of the pigsty and parallel with the sides 5,6 of a grid 1. The two other sides 7,8 of a grid are plane and intended for abutment against each other. The sides 7,8 of the grids may be provided with engaging locking means.

The support on the ribs 4 take place by means of grooves 9 which are formed at the underside of teeth 10 wellknown by themselves, said teeth being formed at each side of the grid 1. In between each tooth 10 there is a gap 11 intended for accommodating a tooth 10 of an adjacent grid. Thus, a substantially continuous floor may be formed.

Instead of a number of the grids 1, a number of heating elements 12 may be provided according to the invention. For example, there may be provided a number of six with a placing as shown on FIG. 1. Another number of heating elements 12 is possible. It is also possible to place the heating elements in another way than the by placing illustrated on FIG. 1.

Figure 3:
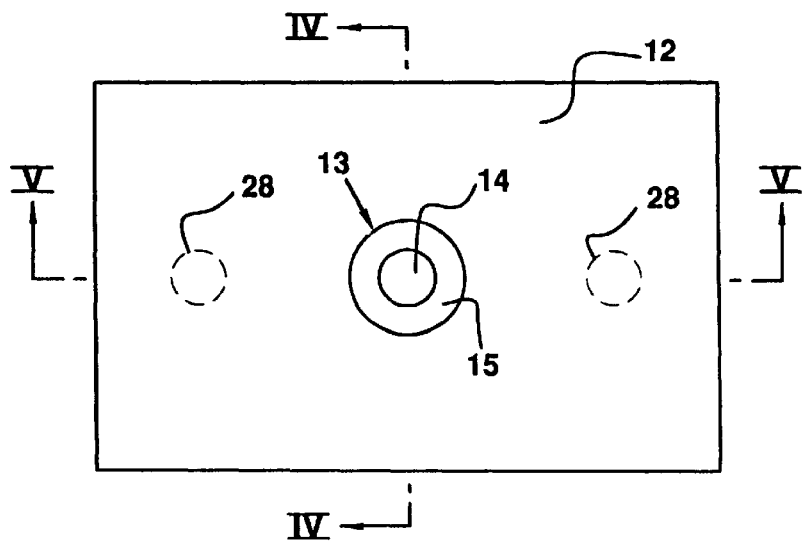
FIG. 3 shows a two-dimensional view illustrating a heating element according to the invention, FIG, 4 shows a partial section view on the line IV—IV on FIG. 3.

On FIG. 3 is seen a heating element 12 as from above, when it is placed on a floor. The heating element 12 in the shown embodiment is shaped as an insertable element intended to be placed in a frame that has an outer contour corresponding to the one which is shown for the grid 1 on FIG. 2. The frame element thus constitutes a modular element which may be built together with the grids 1.

Figure 5:
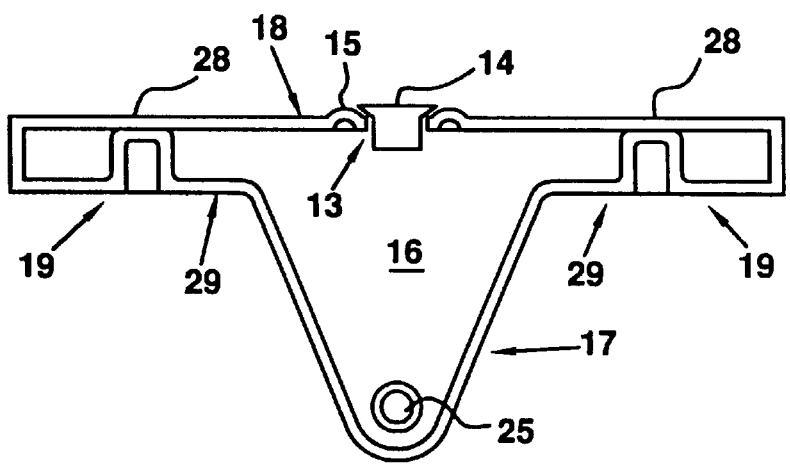
FIG. 5 shows a partial section view on the line V—V on FIG. 3.

The heating element 12 is provided at its top side with a filling aperture 13, which is closed by means of a stopper 14 (FIG. 5). The stopper 14 is placed within a raised bead 15 so that pigs may not unintentionally remove the stopper 14. The stopper may be placed in the aperture 13 in a friction fit or via a screw thread. It will also be possible to form the stopper with a bayonet joint.

Figure 4:
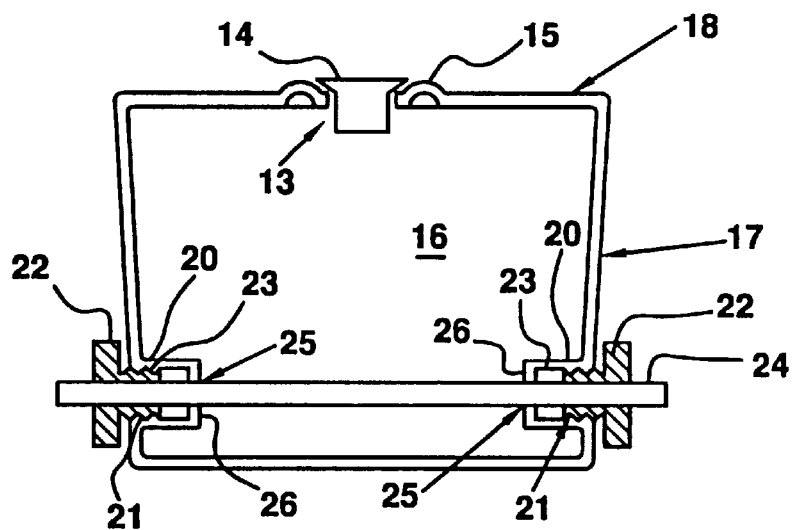

FIG. 4 shows a section on the line IV—IV on FIG. 3. The heating element 12 has an internal chamber 16. The chamber 16 is substantially T-shaped, as it has a stem 17 extending downward away from a space 18 of the heating element, and a cross branch 19 extending immediately below the surface 18 of the heating element. At the bottom of the stem 17 of the T there are provided stubs 20 opposite each other, said stubs being provided with screw thread 21. These threads are intended to receive a union 22 together with a packing 23. In the shown embodiment the chamber 16 is placed at the centre of the heating element 12. Alternatively, the chamber 16 may be placed at one of the lateral edges, so that seen in a sectional view it is substantially L-shaped.

A pipe 24 is put through the union, the packing, and an aperture 25 formed in the bottom of the stub 20 and which is encircled by an annular projection 26. The pipe 24 is intended for conveying liquid or steam. It is made of a heat transmitting material that may be in heat transmitting connection with a liquid that is filled into the chamber 16. In order to achieve a sealing between the pipe 24 and the chamber 16 the union is tightened. Hereby the packing 23 will expand radially as it is squeezed into a fixed position between the union 22 and the projection 26. Hereby, a fluid tight connection between the pipe 24 and the chamber 16 is achieved.

The apertures 25 are situated at such a distance below the surface 18 of the floor that they are found at a level below the underside 27 of the ribs 4, Hereby, the pipes 24 may very easily be mounted in a heating element 12. If a number of lined-up heating elements 12 is used, the pipe 24 will be able to be slided through all the elements after they have been mounted in the floor. Thereafter the unions are tightened fast, Hereafter the chambers 16 may be filled up with liquid. The pipe ends are connected with a heat supply source and a return connection.

FIG. 5 shows that at certain points 28 connection between the top side 18 of the chamber and the underside 29 at the upper part of the chamber is established. Hereby, a greater stability against twisting for the heating element is achieved.

In the previous figures an isolation in connection with the heating elements has not been shown. However, as illustrated on FIG. 6, there will thus be used an isolation 30 at the underside 29 of the heating element 12 in order to prevent radiation of heat downwards. On FIG. 6 a schematic cross section of a second embodiment for a heating element 12 according to the invention is shown. In this embodiment, the chamber 16 of the heating element is provided with two downward directed extensions 31 corresponding to the stem 17 of the T. At the bottom of these extensions, there are apertures 25 for the pipes 24. The heating element 12 may be supported by several ribs 4. However, it is preferred that only one longitudinal rib 4 which engages grooves at each side of the heating element 12 is used.

Figure 6:
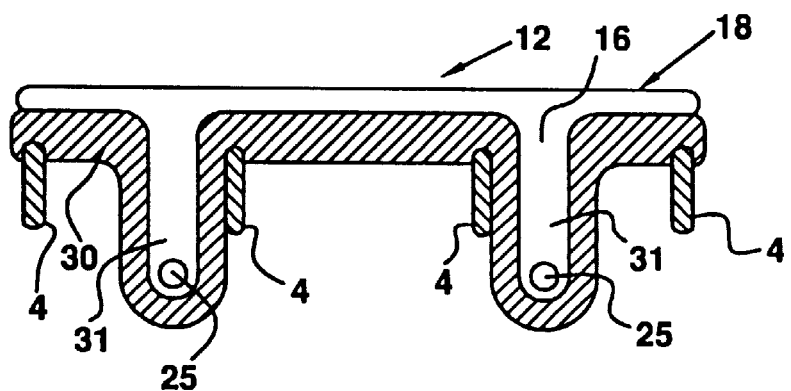
FIG. 6 shows a schematic section through a second embodiment of a heating element according to the invention.
Figure 7:
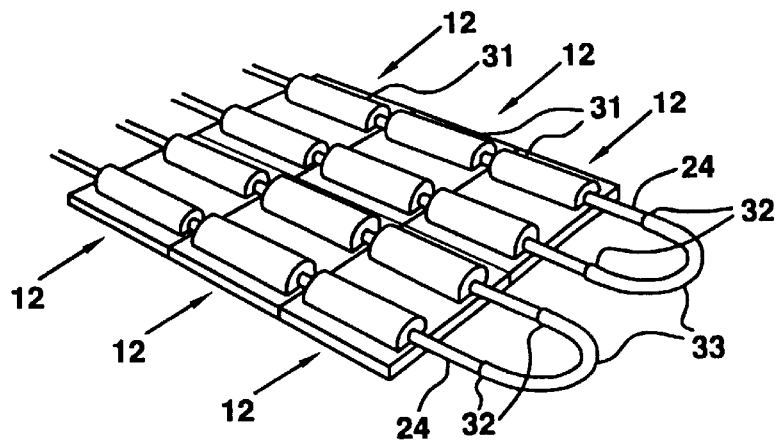
FIG. 7 shows a schematic perspective view of a number of juxtaposed heating elements according to the invention as seen from below when in use.

FIG. 7 is a schematic view as seen from below illustrating interconnection of six heating elements 12 of the kind shown on FIG. 6. Straight continuous pipes 24 extend through the extensions 31 in lined-up heating elements 12. The ends 32 of the pipes are connected with flexible hoses 33 for conducting the water in a meandering way through a number of heating elements 12. The last pipe ends in a meandering circuit (not shown) will be connected with a heat supply source together with pumps pumping liquid or gas through the pipes 24.

Figure 8:
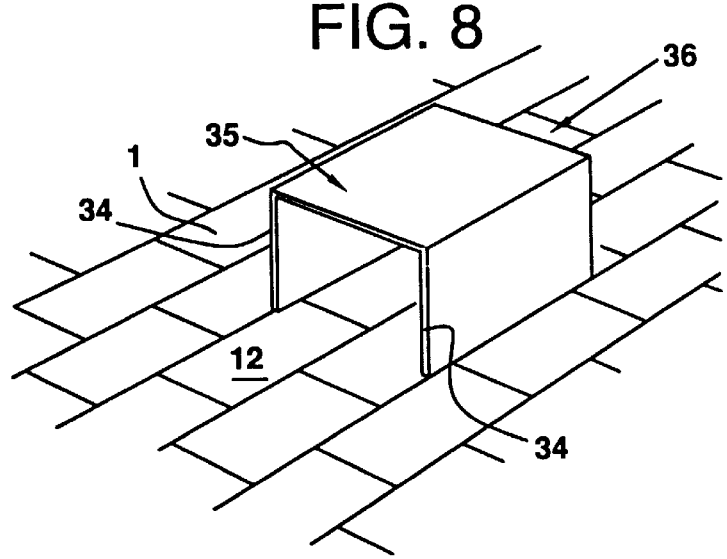
FIG. 8 shows a schematic perspective view of an embodiment where the heating element has chamber parts directed upwardly from the floor.
Figure 9:
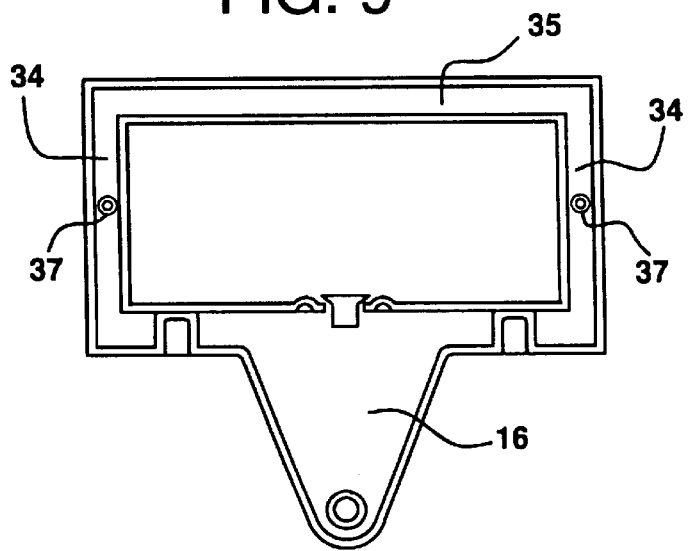
FIG. 9 shows a section corresponding to FIG. 5 illustrating a further embodiment of a heating element according to the invention.

On FIGS. 8 and 9 is seen an embodiment where the chamber 16 is provided with vertically upward directed chamber sections 34. These sections may as shown on FIG. 8 constitute side walls in a heating box for piglets. The upward directed chamber sections 34 may be connected with a substantially horizontal chamber part 35 which constitutes a ceiling in the heating box. The further chamber parts 34,35 may be directly connected with the chamber 16 as illustrated. Alternatively, the further chamber parts may be connected indirectly with the chamber 16 or directly with the conduit 24 (not shown).

The heating box may be arranged in connection with a single heating element 12 as illustrated on FIG. 9. Alternatively, the heating box may extend over several lined-up heating elements 12 as illustrated on FIG. 8. In the latter case, the further chamber sections 34 will preferably be provided with a heat conducting conduit (see FIG. 9) which is connected directly with the conduit 24 that is found under the formed floor.

On FIG. 9 there is shown an embodiment where the further chamber parts are directly connected with the chamber 16. Alternatively, the further chamber parts 34 may be connected with the chamber 16 via quick-acting couplings (not shown) which also constitute connection elements for the heating element 12.

In the shown embodiments, the heating element 12 is seen as an insertable element. Alternatively, the heating element may be manufactured as an integrated part and may have integral engagement means such as tooth-shaped projections 10 as shown in the grid. In such an embodiment, the heating element 12 can be mounted simultaneously with the mounting of the grids 1. Hereafter, the pipes 24 are slid through the chambers 16 and screwed fast. This assembling is simple and quick.

In the shown embodiments the chamber 16 is formed by the external encircling of the heating element. Alternatively, it is possible that the chamber 16 is formed in the shape of a flexible container that is laid inside the encircling of the heating element. Such a flexible container will be bag-shaped and have its inlet mouth placed in the aperture and be fastened to the chamber after the stopper 14 has been put in. Because of the flexibility the container will fill out all of the inside of the heating element by filling it with liquid as the container may also be kept around a conduit in order to establish the necessary heat transmission. Such a flexible container may be made of plastic or metal foils or combinations thereof. In such a construction an increased security against unintentional leakage from a heating element will be achieved.

What is claimed is:

1. A heating element (12) for use in a building and of the kind that is built up from modular elements having engagement means for interacting with corresponding engagement means on other modular elements, which heating element comprise chamber (16,34,35) containing a heating liquid and which chamber constitutes one side of a heat exchanger, the other side of which heat exchanger is constituted by a conduit (24) extending through the chamber (16) and connecting a number of heating elements (12), which conduit is a liquid- or steam conveying conduit that is fastened in liquid tight connection with passageways (25) in two mutually facing walls of the chamber, characterised in that the heating element (12) is adapted for use in a floor, that parallel grooves (9) are arranged at the underside of the heating equipment in a location corresponding to underlying supporting rails (4) and which function is to engage the rails (4), that the chamber (16) is provided immediately under a floor surface (18) of the element (12), and that at least a part (17,31) of the chamber has such a depth under the floor surface (18) that the passageways (25) are at level under the support rails (4).

2. A heating element according to claim 1, characterised in that the conduit (24) is straight.

3. A heating element according to claim 1, characterised in that the passageways (25) are constituted by threaded pipe stubs (20) made integrally with the side walls of the chamber and which interact with packing (23) and a union (22) that may be screwed into the stub (20) for expanding the packing (23) radially into a tightening engagement about the conduit (24).

4. A heating element according to claim 1, characterised in that the chamber (16) has a mainly T-shaped cross section as viewed in a direction perpendicular to the engagement grooves, and that the conduit (24) passes through the chamber in a position at the bottom of the stem (17) of the T.

5. A heating element according to claim 4, characterised in that there is provided a number of distributed connecting points (28) between the top (18) and the under side (29) of the part of the chamber (16) that is constituted by the crossing branch (19) of the T.

6. A heating element according to claim 1, characterised in that the conduit (24) is a continuous liquid conduit which extends without joints through a number of chambers arranged along a line and is made of a heat transmitting material.

7. A heating element according to claim 1, characterised in that it is made with integral engagement means together with supporting grooves and thus constitutes a modular element.

8. A heating element according to claim 1, characterised in that it is made as an insertable element which is made for mounting in a frame element constituting a modular element.

9. A heating element according to claim 1, characterised in that the chamber (16) is connected with at least upwardly directed chamber sections (34), which form the walls for a heating box (36) that is found on the formed floor, and that the further upwardly directed chamber sections (34) are connected with the chamber (16) under the floor surface (18).

10. A heating element according to claim 9, characterised in that the further chamber sections (34) are provided with a conduit extending through the further chamber sections, and which is connected directly with the conduit placed under the formed floor.

11. The heating element of claim 1, wherein the building is a stable for livestock.

12. The heating element of claim 6, wherein the material is metallized plastic.

13. The heating element of claim 9, wherein the walls include ceiling (35).

* * * * *